United States Patent
Kang et al.

(10) Patent No.: US 8,078,134 B2
(45) Date of Patent: Dec. 13, 2011

(54) MOBILE TERMINAL AND METHOD OF CONTROLLING OPERATION OF THE MOBILE TERMINAL

(75) Inventors: Rae Hoon Kang, Seoul (KR); Sang Soo Kim, Seoul (KR); Ha Yang Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 452 days.

(21) Appl. No.: 12/463,980

(22) Filed: May 11, 2009

(65) Prior Publication Data

US 2009/0298550 A1     Dec. 3, 2009

(30) Foreign Application Priority Data

Jun. 2, 2008 (KR) .................. 10-2008-0051706

(51) Int. Cl.
*H04B 1/16* (2006.01)
(52) U.S. Cl. .................. 455/343.1; 455/575.1
(58) Field of Classification Search .......... 455/343.1, 455/575.1, 575.3, 575.4, 90.3, 347, 575.7, 455/566, 550.1; 379/433.06, 433.07
See application file for complete search history.

(56) References Cited

U.S. PATENT DOCUMENTS

| | | | |
|---|---|---|---|
| 6,839,575 B2 | 1/2005 | Ostergaard | |
| 7,774,029 B2 * | 8/2010 | Lee et al. | 455/566 |

FOREIGN PATENT DOCUMENTS

| | | |
|---|---|---|
| JP | 2003-319043 | 11/2003 |
| JP | 2008-017373 | 1/2008 |
| KR | 10-2006-0034114 | 4/2006 |
| KR | 10-2006-0045849 | 5/2006 |
| KR | 10-2006-0065299 | 6/2006 |
| KR | 10-2007-0041224 | 4/2007 |

* cited by examiner

*Primary Examiner* — Joseph Lauture
(74) *Attorney, Agent, or Firm* — Lee, Hong, Degerman, Kang & Waimey

(57) ABSTRACT

A mobile terminal is provided including a display module, an acceleration sensor, and a controller. The display module is for displaying first content and second content. The acceleration sensor is for providing measurement data on a direction of gravitational acceleration. The controller is configured to display the first content and the second content in line vertically and to rotate the first content and the second content when the measurement data indicate that the mobile terminal has been rotated to a first position while uniformly maintaining a display direction of the display module. The controller is further configured to display the first content and the second content in line horizontally and to rotate the first content and the second content when the measurement data indicate that the mobile terminal has been rotated to a second position while uniformly maintaining the display direction of the display module.

20 Claims, 13 Drawing Sheets

MOBILE TERMINAL AND METHOD OF CONTROLLING OPERATION OF THE MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2008-0051706, filed on Jun. 2, 2008, the contents of which are incorporated by reference herein in its entirety.

FIELD OF THE INVENTION

The present invention relates generally to a mobile terminal and a method of controlling the operation of the mobile terminal.

DESCRIPTION OF THE RELATED ART

A mobile terminal is a portable device equipped with one or more of functions for performing voice and video communications, inputting and outputting information, and storing data.

Mobile terminals are increasingly being implemented with multimedia player capabilities. Mobile terminals equipped with two or more display regions have recently been developed. These mobile terminals are capable of displaying various software programs.

If multiple contents are displayed in two or more display regions, most people tend to view the display regions by following certain directions, for example, a direction from the top to the bottom and a direction from the left to the right. For example, most people tend to view an upper display region and then a lower display region or to view a left display region and then a right display region. Therefore, it is necessary to develop ways to uniformly maintain the order of display of multiple contents and thus to maximize user convenience.

In addition, when a mobile terminal capable of displaying multiple contents in two or more display regions is rotated, it is necessary to develop ways to maximize user convenience by changing the direction and order of display of a plurality of contents in the display regions and the sizes of the contents according to the rotation of the mobile terminal.

SUMMARY OF THE INVENTION

In an exemplary embodiment of the present invention, a method of controlling the operation of a mobile terminal is provided. The mobile terminal includes a display module for displaying first content and second content and an acceleration sensor for providing measurement data on a direction of gravitational acceleration. The first content and the second content are displayed on the display module. The first content and the second content are displayed in line vertically and the first content and the second content are rotated when the measurement data indicate that the mobile terminal has been rotated to a first position while uniformly maintaining a display direction of the display module. The first content and the second content are displayed in line horizontally and the first content and the second content are rotated when the measurement data indicate that the mobile terminal has been rotated to a second position while uniformly maintaining the display direction of the display module.

In one embodiment, the first content and the second content are at least one of text data, moving images, still images, or virtual keypads.

In one embodiment, the second position is 90 degrees or −90 degrees from the first position.

In one embodiment, the mobile terminal has a widthwise edge and a lengthwise edge longer than the widthwise edge, the first position is a vertical position of the mobile terminal when the lengthwise edge is approximately perpendicular to the ground, and the second position is a horizontal position of the mobile terminal when the lengthwise edge is approximately parallel to the ground.

In one embodiment, when the mobile terminal is rotated clockwise from the horizontal position to the vertical position, the first content and the second content are rotated counterclockwise. When the mobile terminal is rotated counterclockwise from the horizontal position to the vertical position, the first content and the second content are rotated clockwise and the first content and the second content are switched in position. When the mobile terminal is rotated clockwise from the vertical position to the horizontal position, the first content and the second content are rotated counterclockwise and the first content and the second content are switched in position. When the mobile terminal is rotated counterclockwise from the vertical position to the horizontal position, the first content and the second content are rotated clockwise.

In one embodiment, the display module comprises a first display module and a second display module and the first content and the second content are displayed separately in one of the first display module or the second display module.

In one embodiment, when the first content is displayed in the first display module and the second content is displayed in the second display module, and when the mobile terminal is rotated clockwise from the horizontal position to the vertical position, the first content is rotated counterclockwise in the first display module and the second content is rotated counterclockwise in the second display module. Alternatively, when the mobile terminal is rotated counterclockwise from the horizontal position to the vertical position, the first content is rotated clockwise and moved to the second display module and the second content is rotated clockwise and moved to the first display module. Alternatively, when the mobile terminal is rotated clockwise from the vertical position to the horizontal position, the first content is rotated counterclockwise and moved to the second display module and the second content is rotated counterclockwise and moved to the first display module. Alternatively, when the mobile terminal is rotated counterclockwise from the vertical position to the horizontal position, the first content is rotated clockwise in the first display module and the second content is rotated clockwise in the second display module.

In one embodiment, when the first content is displayed in the second display module and the second content is displayed in the first display module, and when the mobile terminal is rotated clockwise from the horizontal position to the vertical position, the first content is rotated counterclockwise in the second display module and the second content is rotated counterclockwise in the first display module. Alternatively, when the mobile terminal is rotated counterclockwise from the horizontal position to the vertical position, the first content is rotated clockwise and moved to the first display module and the second content is rotated clockwise and moved to the second display module. Alternatively, when the mobile terminal is rotated clockwise from the vertical position to the horizontal position, the first content is rotated counterclockwise and moved to the first display module and the second content is rotated counterclockwise and moved to the second display module. Alternatively, when the mobile terminal is rotated counterclockwise from the vertical position to the horizontal position, the first content is rotated clockwise in the second display module and the second content is rotated clockwise in the first display module.

In one embodiment, when the mobile terminal is rotated from the horizontal position to the vertical position, the method further includes displaying a first scroll bar for scrolling the first content when the first content cannot be entirely displayed; and displaying a second scroll bar for scrolling the second content when the second content cannot be entirely displayed.

In one embodiment, when the mobile terminal is rotated from the vertical position to the horizontal position, the method further includes removing from display a first scroll bar for scrolling the first content when the first scroll bar is displayed; and removing from display a second scroll bar for scrolling the second content when the second scroll bar is displayed.

In an exemplary embodiment of the present invention, a method of controlling the operation of a mobile terminal including a display module having a first display region and a second display region and including an acceleration sensor for providing measurement data on a direction of gravitational acceleration is provided. First content and second content are displayed in a first display region and a second display region. One of the first content or the second content is scaled up and the scaled-up content is displayed in a combined area of the first display region and the second display region, if the measurement data indicates the mobile terminal has been rotated while uniformly maintaining the display direction of the display module.

In one embodiment, the method further includes terminating the scaling up of the one of the first content or the second content by displaying the first content and the second content in the first display region and the second display region as previously displayed.

In one embodiment, said scaling up includes gradually increasing a display area of the first content and gradually decreasing a display area of the second content until the second content is no longer displayed when the first content is above the second content in a vertical orientation or is left of the second content in a horizontal orientation; and gradually increasing a display area of the second content and gradually decreasing a display area of the first content until the first content is no longer displayed when the second content is above the first content in a vertical orientation or is left of the first content in a horizontal orientation.

In one embodiment, when the mobile terminal is rotated clockwise from a second position to a first position, the second content is removed from being displayed, the first content is rotated counterclockwise, and the first content is scaled up for display in both the first display region and the second display region. When the mobile terminal is rotated counterclockwise from the second position to the first position, the first content is removed from being displayed, the second content is rotated clockwise, and the second content is scaled up for display in both the first display region and the second display region. When the mobile terminal is rotated clockwise from the first position to the second position, the first content is removed from being displayed, the second content is rotated counterclockwise, and the second content is scaled up for display in both the first display region and the second display region. When the mobile terminal is rotated counterclockwise from the first position to the second position, the second content is removed from being displayed, the first content is rotated clockwise, and the first content is scaled up for display in both the first display region and the second display region.

In one embodiment, the display module includes a first display module having the first display region and a second display module having the second display region. The first content and the second content are displayed separately in one of the first display module or the second display module. The first position is a vertical position in which the display module extends vertically and perpendicular to the ground. The second position is a horizontal position in which the display module extends horizontally and parallel to the ground. When the mobile terminal is rotated clockwise from the horizontal position to the vertical position, the second content is removed from being displayed, the first content is rotated counterclockwise, and the first content is displayed scaled up in the first display module and the second display module. When the mobile terminal is rotated counterclockwise from the horizontal position to the vertical position, the first content is removed from being displayed, the second content is rotated clockwise, and the second content is displayed scaled up in the second display module and the first display module. When the mobile terminal is rotated clockwise from the vertical position to the horizontal position, the first content is removing from being displayed, the second content is rotated counterclockwise, and the second content is displayed scaled up in the second display module and the first display module. When the mobile terminal is rotated counterclockwise from the vertical position to the horizontal position, the second content is removed from being displayed, the first content is rotated clockwise, and the first content is displayed scaled up in the first display module and the second display module.

In an exemplary embodiment of the present invention, a mobile terminal is provided including a display module, an acceleration sensor, and a controller. The display module is for displaying first content and second content. The acceleration sensor is for providing measurement data on a direction of gravitational acceleration of the mobile terminal. The controller is configured to display the first content and the second content in line vertically and to rotate the first content and the second content when the measurement data indicate that the mobile terminal has been rotated to a first position while uniformly maintaining a display direction of the display module. The controller is further configured to display the first content and the second content in line horizontally and to rotate the first content and the second content when the measurement data indicate that the mobile terminal has been rotated to a second position while uniformly maintaining the display direction of the display module.

In an exemplary embodiment of the present invention, a mobile terminal is provided including a display module, an acceleration sensor, and a controller. The display module has a first display region and a second display region. The acceleration sensor is for providing measurement data on a direction of gravitational acceleration of the mobile terminal. The controller is configured to display first content and second content in the first display region and the second display region. The controller is further configured to scale up one of the first content or the second content and to display the scaled-up content in a combined area of the first display region and the second display region, if the measurement data indicates the mobile terminal has been rotated while uniformly maintaining the display direction of the display module.

DETAILED DESCRIPTION

The term 'mobile terminal', as used herein, may indicate a mobile phone, a smart phone, a laptop book computer, a digital broadcast receiver, a personal digital assistant (PDA), a portable multimedia player (PMP), or a navigation device.

Figure 1:
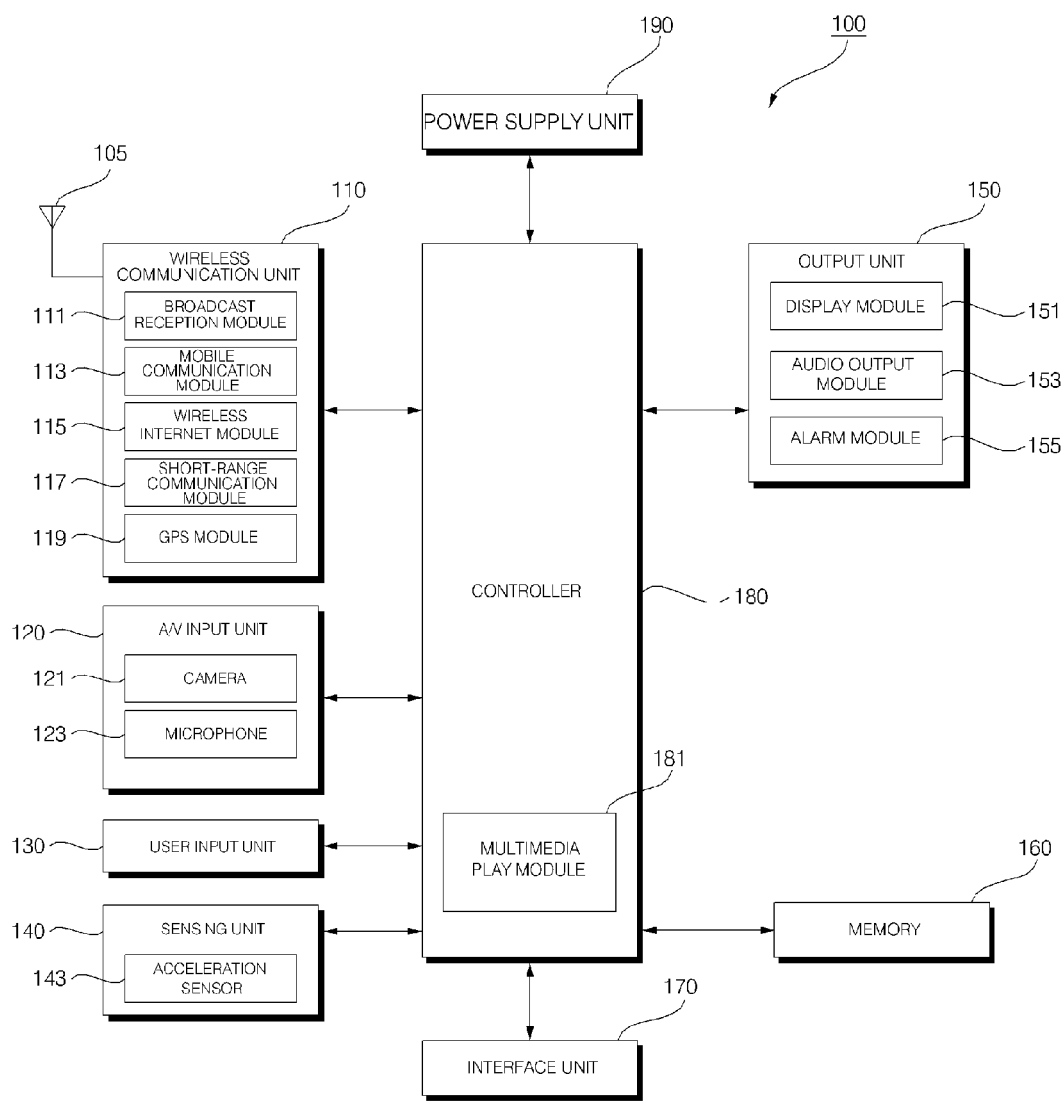
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include an antenna 105, a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and a global positioning system (GPS) module 119.

The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) or electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein.

The broadcast signal and/or the broadcast-related information received by the broadcast reception module 110 may be stored in the memory 160.

The mobile communication module 113 transmits wireless signals to or receives wireless signals from at least a base station, an external terminal, or a server through a mobile communication network. The wireless signals may include various types of data according to whether the mobile terminal 100 transmits/receives voice call signals, video call signals, or text/multimedia messages.

The wireless Internet module 115 may be a module for wirelessly accessing the Internet. The wireless Internet module 115 may be embedded in the mobile terminal 100 or may be installed in an external device.

The short-range communication module 117 may be a module for short-range communication. The short-range communication module 117 may use various short-range communication techniques such as Bluetooth®, radio frequency identification (RFID), infrared data association (IrDA), ultra wideband (UWB), and ZigBee®.

The GPS module 119 may receive position information from a plurality of GPS satellites.

The A/V input unit 120 may be used to receive audio signals or video signals. The A/V input unit 120 may include one or more cameras 121 and a microphone 123. The camera 121 processes various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted outside the mobile terminal 100 through the wireless communication unit 110. The mobile terminal 100 may include more than two cameras.

The microphone 123 receives external sound signals during a call mode, a recording mode, or a voice recognition mode with the use of a microphone and converts the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

The sensing unit 140 determines a current state of the mobile terminal 100 such as whether the mobile terminal 100 is opened or closed, the position of the mobile terminal 100 and whether the mobile terminal 100 is placed in contact with a user. In addition, the sensing unit 140 generates a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include an acceleration sensor 143. Acceleration sensors are a type of device for converting an acceleration variation into an electric signal. With recent developments in micro-electromechanical system (MEMS) technology, acceleration sensors have been widely used in various products for various purposes. For example, an acceleration sensor may be installed in an airbag system for an automobile and may thus be used to detect collisions. Alternatively, an acceleration sensor may be used as an input device for a computer game and may sense the motion of the human hand during a computer game. Two or three acceleration sensors 143 representing different axial directions may be installed in the mobile terminal 100. Alternatively, only one acceleration sensor 143 representing a Z axis may be installed in the mobile terminal 100.

The output unit 150 may output audio signals, video signals, and alarm signals. The output unit 150 may include the display module 151, an audio output module 153, and an alarm module 155.

The display module 151 may display various information processed by the mobile terminal 100. For example, if the mobile terminal 100 is in a call mode, the display module 151 may display a user interface (UI) or a graphical user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel monitors whether the touch screen panel is touched by a user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the control unit 180. The control unit 180 then determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module and an internal display module.

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal, and a vibration signal. The alarm module 155 may output a vibration signal upon receiving a call signal or a message. In addition, the alarm module 155 may receive a key signal and may output a vibration signal as feedback to the key signal. Once a vibration signal is output by the alarm module 155, the user may recognize that an event has occurred. A signal for notifying the user of the occurrence of an event may be output by the display module 151 or the audio output module 153.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 is supplied with power by an external power source or an internal power source and supplies power to other components in the mobile terminal 100.

Figure 2:
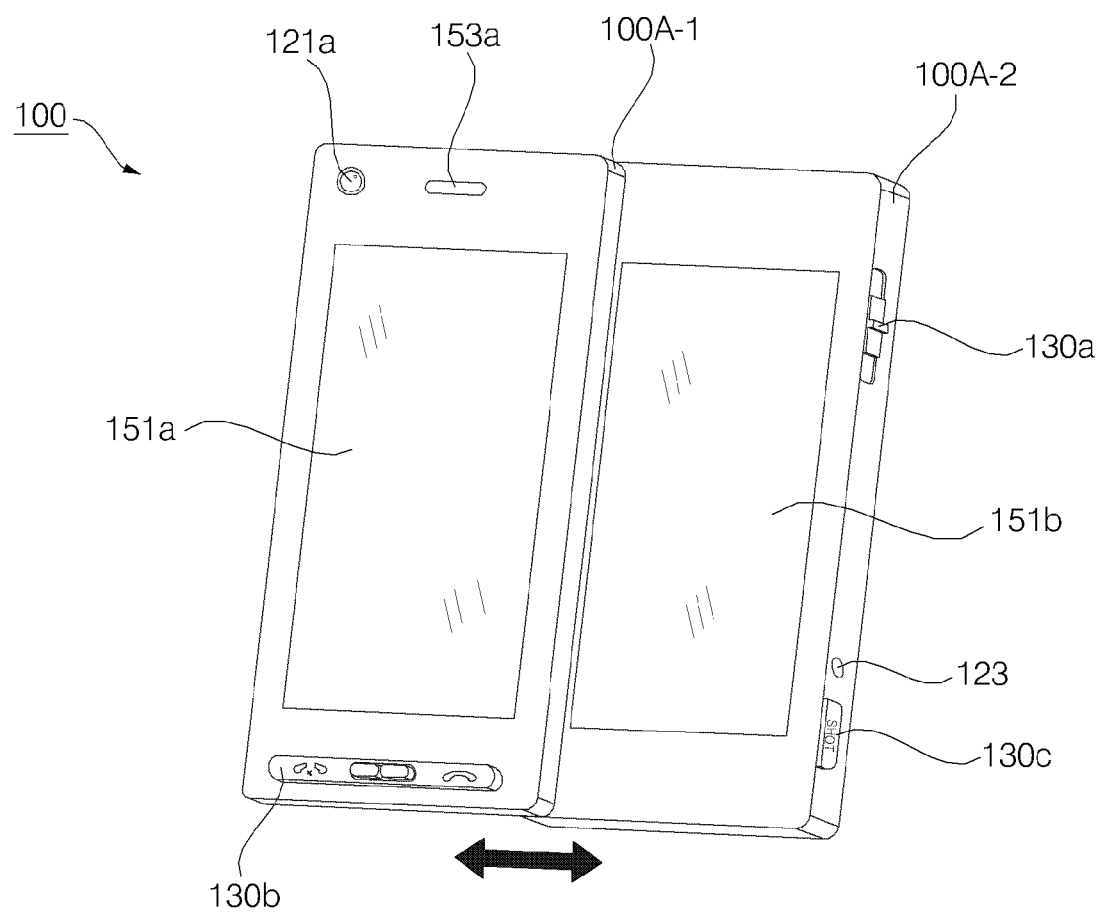
FIG. 2 illustrates a front perspective view of the mobile terminal according to an exemplary embodiment of the present invention.

FIG. 2 illustrates a front perspective view of the mobile terminal 100. Referring to FIG. 2, the mobile terminal 100 may include two display modules: first and second display modules 151a and 151b. A front case 100A-1 and a rear case 100A-2 may form the exterior of the mobile terminal 100. Various electronic devices may be installed in the empty space between the front case 100A-1 and the rear case 100A-2. The front case 100A-1 and the rear case 100A-2 may be coupled to each other in a folder-type fashion or in a slider-type fashion. At least one middle case may be additionally provided between the front case 100A-1 and the rear case 100A-2. The front case 100A-1, the rear case 100A-2, and the middle case may be formed of synthetic resin through injection molding. Alternatively, the front case 100A-1, the rear case 100A-2, and the middle case may be formed of a metal material such as stainless steel (STS) or titanium (Ti).

The first display module 151a, a first audio output unit 153a, and a first camera 121a may be disposed on the front case 100A-1. A second display module 151b may be disposed on the rear case 100A-2. A first user input module 130c and the microphone 123 may be disposed on one side surface of the rear case 100A-2. A second user input unit 130b such as a keypad may be disposed on the front case 100A-1 or the rear case 100A-2.

Each of the first and second display modules 151a and 151b may include a liquid crystal display (LCD) or an organic light-emitting diode (OLED) and may thus be able to provide various information visually. Each of the first and second display modules 151a and 151b may form a layer structure by being overlaid by a touch pad and may thus serve as a touch screen capable of receiving information in response to a touch input made by the user.

The first audio output unit 153a may be implemented as a receiver or a speaker. The first camera 121a may be configured to be suitable for capturing a still or moving image of the user. The microphone 123 may be configured to be suitable for receiving the voice of the user or other sounds.

The user input unit 130 may include the first user input unit 130a, the second user input unit 130b, and a third user input unit 130c. Each of the first through third user input units 130a through 130c may be implemented as a dome switch or a touch pad capable of receiving a command or information in response to a push input or a touch input made by the user. Alternatively, each of the first through third user input units 130a through 130c may be implemented as a jog wheel or a joystick capable of being rotated by the user. The first user input unit 130a may serve as a hot key for activating certain functions of the mobile terminal 100, and the second user input unit 130b may be used to input start, end, and call commands and to choose an operating mode for the mobile terminal 100.

Figure 3:
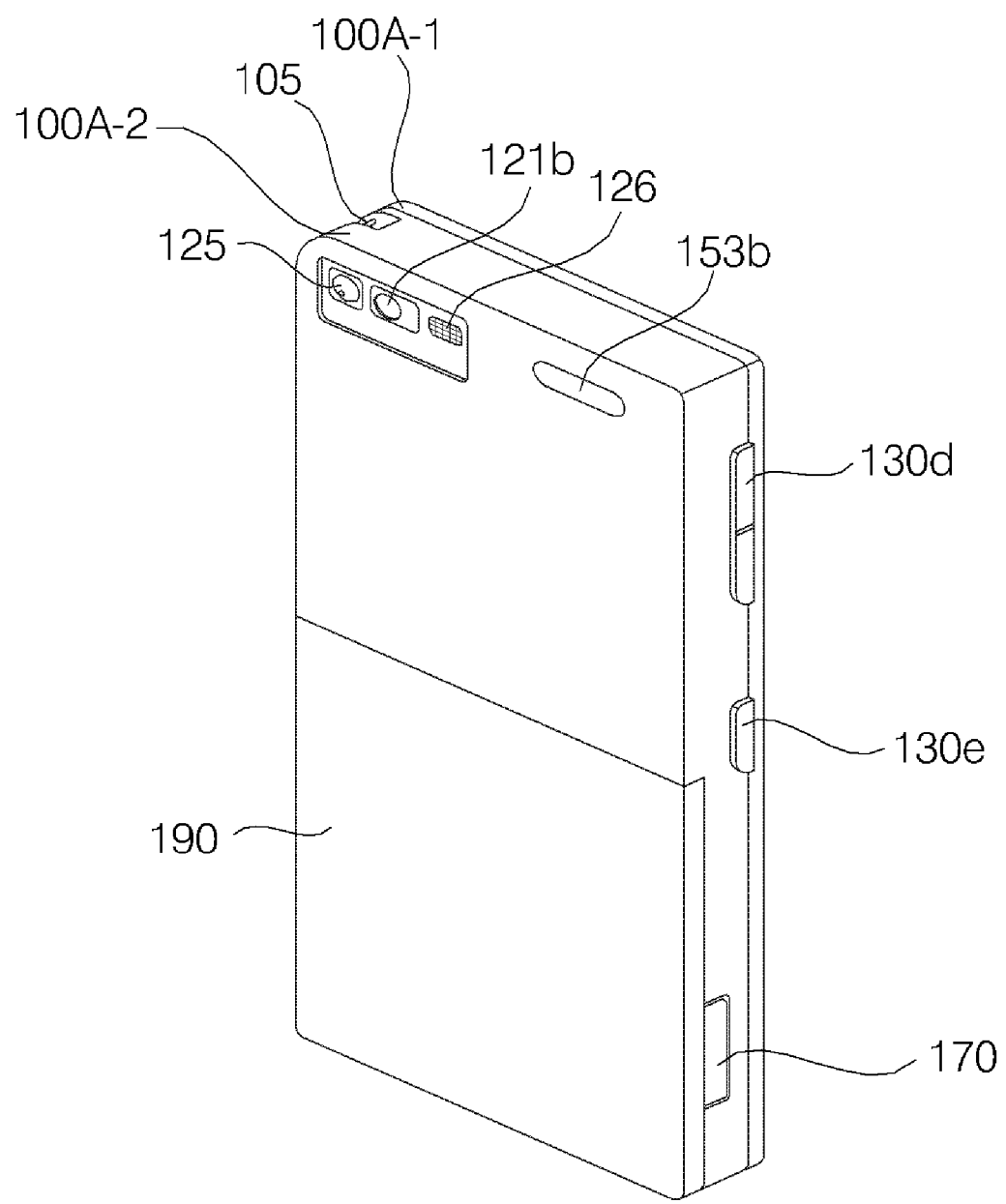
FIG. 3 illustrates a rear perspective view of the mobile terminal shown in FIG. 2.

FIG. 3 illustrates a rear perspective view of the mobile terminal 100. Referring to FIG. 3, a fourth user input unit 130d, a fifth user input unit 130e and the interface unit 170 may be disposed on one side surface of the rear case 100A-2, and a second camera 121b may be disposed at the rear of the rear case 100A-2.

The second camera 121b may have a different photographing direction from that of the first camera 121a shown in FIG. 2. In addition, the pixel quantity of the second camera 121b may be different from the pixel quantity of the first camera 121a. For example, the first camera 121a may be used to capture an image of the user's face and then readily transmit the captured image during a video call. Thus, a camera having a low pixel count may be used as the first camera 121a. The second camera 121b may be used to capture an image of an ordinary subject. Given that images captured by the second camera 121b generally do not need to be transmitted, a camera having a high pixel count may be used as the second camera 121b.

A mirror 125 and a camera flash 126 may be disposed near the second camera 121b. The camera flash 126 may illuminate a subject when the second camera 121b captures an image of the subject. The user may look in the mirror 125 for taking a self portrait using the second camera 121b.

A second audio output module 153b may be additionally provided on the rear case 100A-2. The second audio output module 153b may realize a stereo function along with the first audio output module 153a. The second audio output module 153b may also be used during a speaker-phone mode.

An antenna 105 for receiving a broadcast signal may be disposed on one side surface of the rear case 100A-2. The antenna 105 may be installed so as to be able to be extended from the rear case 100A-2.

The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication, or a power supply terminal for supplying operating power to the mobile terminal 100. The interface unit 170 may be a SIM, a UIM, or a card socket for an exterior-type card such as a memory card for storing data.

The power supply unit 190 may be disposed in the rear case 100A-2. The power supply unit 190, for example, a rechargeable battery, may be coupled to the rear case 100A-2 so as to be able to be attached to or detached from the rear case 100A-2.

The second camera 121b is illustrated in FIG. 3 as being disposed on the rear case 100A-2, but the present invention is not restricted to this. The second camera 121b may be optional, if the first camera 121a can rotate and can thus cover the photographing direction of the second camera 121b.

Figure 4:
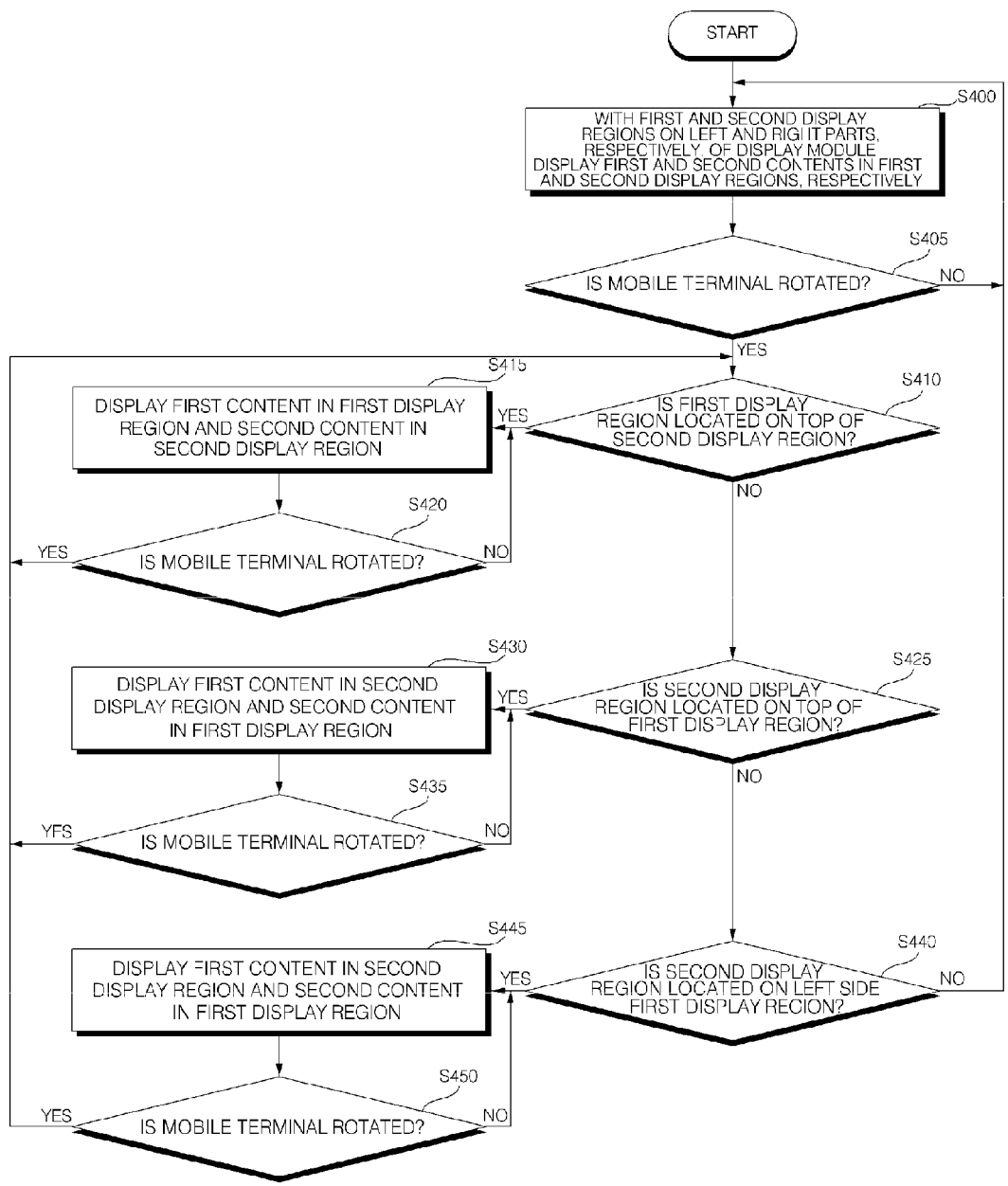
FIG. 4 is a flowchart of a method of controlling the operation of a mobile terminal according to a first embodiment of the present invention.

FIG. 4 illustrates a flowchart of a method of controlling the operation of a mobile terminal according to a first exemplary embodiment of the present invention. The first exemplary embodiment can be applied to a mobile terminal equipped with two or more display modules. For example, if a plurality of display modules of a mobile terminal all fall within a user's field of vision, two or more display regions may be displayed separately on different display modules. In addition, the first exemplary embodiment can also be applied to a mobile terminal equipped with only one display module. In this case, two or more display regions may be displayed together on the screen of the display module.

Referring to FIG. 4, the display module 151 may include first and second display regions. The controller 180 may control the first and second display regions to be on the left and right parts, respectively, of the display module 151 such that they are horizontally in line with each other. Thereafter, a first content may be displayed in the first display region, and a second content may be displayed in the second display region (S400). More specifically, the first and second contents may be displayed in the first and second display regions, respectively, along a first direction. The first direction may be a direction along which a user can easily view the first and second contents. For example, the first direction may be a direction from the top to the bottom.

The first and second contents may be text data, still images, or moving images. The first and second contents may be various types of contents that can be displayed by the display module 151 such as virtual keypads, menus, and icons. The terms 'left', 'right', 'top' and 'bottom', as used herein, indicate relative positions to a direction from which the user views the display module 151.

The acceleration sensor 143 determines whether the mobile terminal 100 has been rotated clockwise or counter-clockwise (S405). The mobile terminal 100 may be rotated in any direction by any angle between 0 and 360 degrees. However, the expression 'the rotation of the mobile terminal 100', as used herein, may imply, but is not limited to, the situations in which the mobile terminal 100 is rotated while uniformly maintaining the display direction of the display module 151, regardless of whether the mobile terminal 100 initially stands upright or lies parallel to the ground.

If it is determined in operation S405 that the mobile terminal 100 has not yet been rotated, the method returns to operation S400. The mobile terminal 100 may be able to be rotated by any angle between 0-360 degrees. Thus, the controller 180 may display the first and second contents on the screen of the display module 151 in various manners according to measurement data provided by the acceleration sensor 143 regarding the direction and angle of rotation of the mobile terminal 100. Four methods of displaying the first and second contents in consideration of the rotation direction and rotation angle of the mobile terminal 100 will hereinafter be described in detail. However, the present invention is not restricted to the four methods.

If it is determined in operation S405 that the mobile terminal 100 has been rotated, the controller 180 may determine whether the first display region is located on top of the second display region (S410).

If it is determined in operation S410 that the first display region is located on top of the second display region, the controller 180 may display the first content in the first display region and the second content in the second display region (S415). As a result, the first and second contents may be displayed vertically in line with each other.

The acceleration sensor 143 determines whether the mobile terminal 100 has been rotated clockwise or counter-clockwise again (S420). If it is determined in operation S420 that the mobile terminal 100 has not been rotated, the method returns to operation S415. On the other hand, if it is determined in operation S420 that the mobile terminal 100 has been rotated, the method returns to operation S410.

If it is determined in operation S410 that the first display region is not located on top of the second display region, the controller 180 may determine whether the second display region is located on top of the first display region (S425).

If it is determined in operation S425 that the second display region is located on top of the first display region, the controller may display the first content in the second display region and the second content in the first display region (S430). As a result, the first and second contents may be displayed vertically in line with each other.

The acceleration sensor 143 determines whether the mobile terminal 100 has been rotated clockwise or counter-clockwise again (S435). If it is determined in operation S435 that the mobile terminal 100 has not been rotated again, the method returns to operation S430. On the other hand, if it is determined in operation S435 that the mobile terminal 100 has been rotated again, the method returns to operation S410.

If it is determined in operation S425 that the second display region is not located on top of the first display region, the controller 180 may determine whether the second display region is located on the left side of the first display region (S440).

If it is determined in operation S440 that the second display region is located on the left side of the first display region, the controller 180 may display the first content in the second display region and the second content in the first display region (S445). As a result, the first and second contents may be displayed horizontally in line with each other.

The acceleration sensor 143 may determine whether the mobile terminal 100 has been rotated clockwise or counter-clockwise again (S450). If it is determined in operation S450 that the mobile terminal 100 has not been rotated again, the method returns to operation S445. On the other hand, if it is determined in operation S450 that the mobile terminal 100 has been rotated again, the method returns to operation S410.

If it is determined in operation S440 that the second display region is not located on the left side of the first display region, the method returns to operation S400. That is, with the first and second display regions on the left and right parts, respectively, of the display module, the controller 180 may display the first content in the first display region and the second content in the second display region (S400). As a result, the first and second contents may be displayed horizontally in line with each other.

Figure 5:
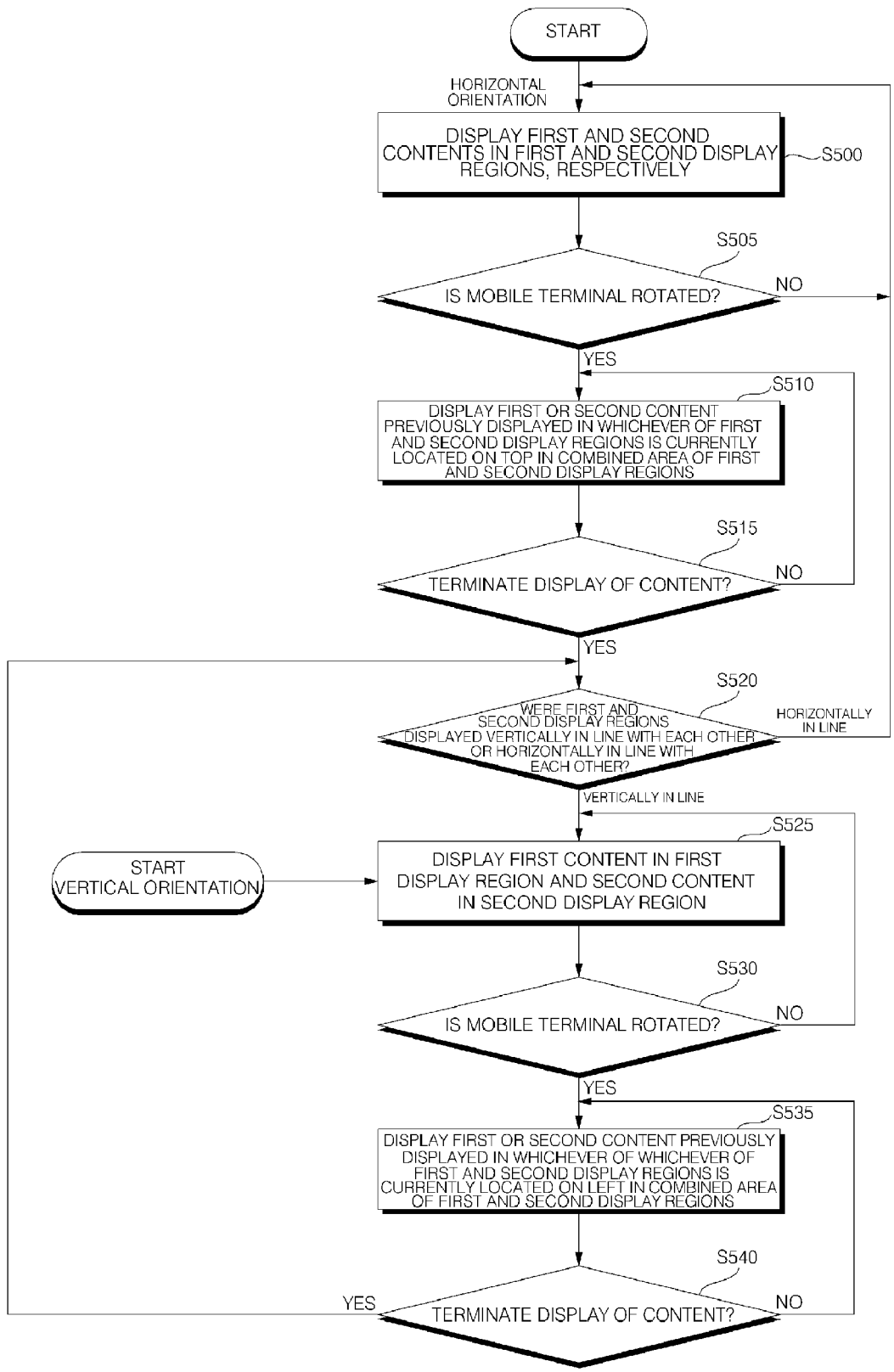
FIG. 5 is a flowchart of a method of controlling the operation of a mobile terminal according to a second embodiment of the present invention.

FIG. 5 illustrates a flowchart of a method of controlling the operation of a mobile terminal according to a second exemplary embodiment of the present invention. Referring to FIG. 5, in a horizontal orientation start position, the controller 180 may display first and second contents in first and second display regions, respectively, so that the first content is displayed in the first display region on a left side of the display module and the second content is displayed in the second display region on a right side of the display module (S500).

Thereafter, the acceleration sensor 143 determines whether the mobile terminal 100 has been rotated clockwise or counterclockwise (S505). If it is determined in operation S505 that the mobile terminal 100 has not yet been rotated, the method returns to operation S500. The mobile terminal 100 may be able to be rotated at an angle of 0-360 degrees. Thus, the controller 180 may display the first and second contents on the screen of the display module 151 in various manners according to the rotation direction and rotation angle of the mobile terminal 100.

If it is determined in operation S505 that the mobile terminal 100 has been rotated, the controller 180 may determine which of the first and second display regions is located on top of the other display region based on measurement data provided by the acceleration sensor 143 regarding the rotation direction and angle of the mobile terminal 100 and may display the first or second content previously displayed in whichever of the first and second display regions is currently located on top of the other display region in the combined area of the first and second display regions (S510). For example, if the mobile terminal 100 is rotated to the right (i.e., clockwise), the first display region may be located on top of the second display region, and thus, the controller 180 may display the first content previously displayed in the first display region in the combined area of the first and second display regions. On the other hand, if the mobile terminal 100 is rotated to the left (i.e., counterclockwise), the second display region may be located on top of the first display region, and thus, the controller 180 may display the second content previously displayed in the second display region in the combined area of the first and second display regions. In this manner, one of the first and second contents may be scaled up and then displayed in the combined area of the first and second display regions.

Thereafter, the controller 180 determines whether a command has been received to terminate the display of whichever of the first and second contents is displayed in the combined area of the first and second display regions (S515). If it is determined in operation S515 that a command has not yet been received to terminate the display of whichever of the first and second contents is currently displayed in the combined area of the first and second display regions, the method returns to operation S510.

On the other hand, if it is determined in operation S515 that a command has been received to terminate the display of whichever of the first and second contents is currently displayed in the combined area of the first and second display regions, the controller 180 may determine whether the first and second display regions were initially displayed on the left and right parts, respectively, of the display module 151 or on the upper and lower parts, respectively, of the display module 151 (S520). It may be determined, either manually by a user or automatically by the controller 180, whether to display the first and second regions on the left and right parts, respectively, of the display module 151 or on the upper and lower parts, respectively, of the display module 151.

Thereafter, if it is determined in operation S520 that the first and second display regions were initially displayed on the left and right parts, respectively, of the display module 151, the method returns to operation S500.

On the other hand, if is determined in operation S520 that the first and second display regions were initially displayed on the upper and lower parts, respectively, of the display module 151, the method returns to operation S525. If the method returns to operation S525, then the start position was a vertical orientation.

Thereafter, the acceleration sensor 143 may determine whether the mobile terminal 100 has been rotated clockwise or counterclockwise (S530). If it is determined in operation S530 that the mobile terminal 100 has not been rotated, the method returns to operation S525.

On the other hand, if it is determined in operation S530 that the mobile terminal 100 has been rotated, the controller 180 may display the first or second content previously displayed in whichever of the first and second display regions is currently located on the left side of the other display region in the combined area of the first and second display regions (S535). For example, if the mobile terminal 100 is rotated to the right (i.e., clockwise), the second display region may be located on the left side of the first display region, and thus, the controller 180 may display the second content previously displayed in the second display region in the combined area of the first and second display regions. On the other hand, if the mobile terminal 100 is rotated to the left (i.e., counterclockwise), the first display region may be located on the left side of the second display region, and thus, the controller 180 may display the first content previously displayed in the first display region in the combined area of the first and second display regions. In this manner, one of the first and second contents may be scaled up and then displayed in the combined area of the first and second display regions.

Thereafter, the controller 180 determines whether a command has been received to terminate the display of whichever of the first and second contents is currently displayed in the combined area of the first and second display regions (S540). If it is determined in operation S540 that a command has not yet been received to terminate the display of whichever of the first and second contents is currently displayed in the combined area of the first and second display regions, the method returns to operation S535.

On the other hand, if it is determined in operation S540 that a command has been received to terminate the display of whichever of the first and second contents is currently displayed in the combined area of the first and second display regions, the method returns to operation S520.

FIGS. 6 through 10 illustrate diagrams for explaining the method of the first exemplary embodiment.

Figure 6:
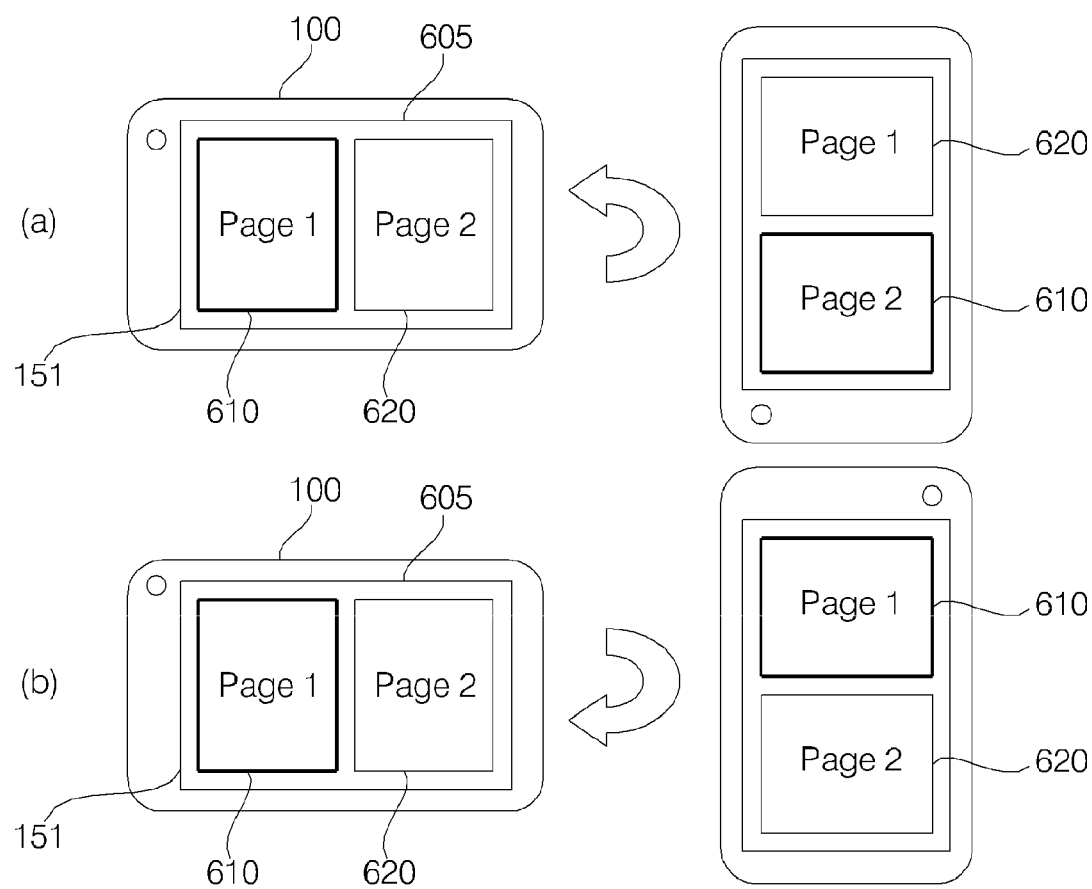
FIG. 6, FIG. 7, FIG. 8, FIG. 9, and FIG. 10 are diagrams for explaining the method of the first exemplary embodiment.
Figure 7:
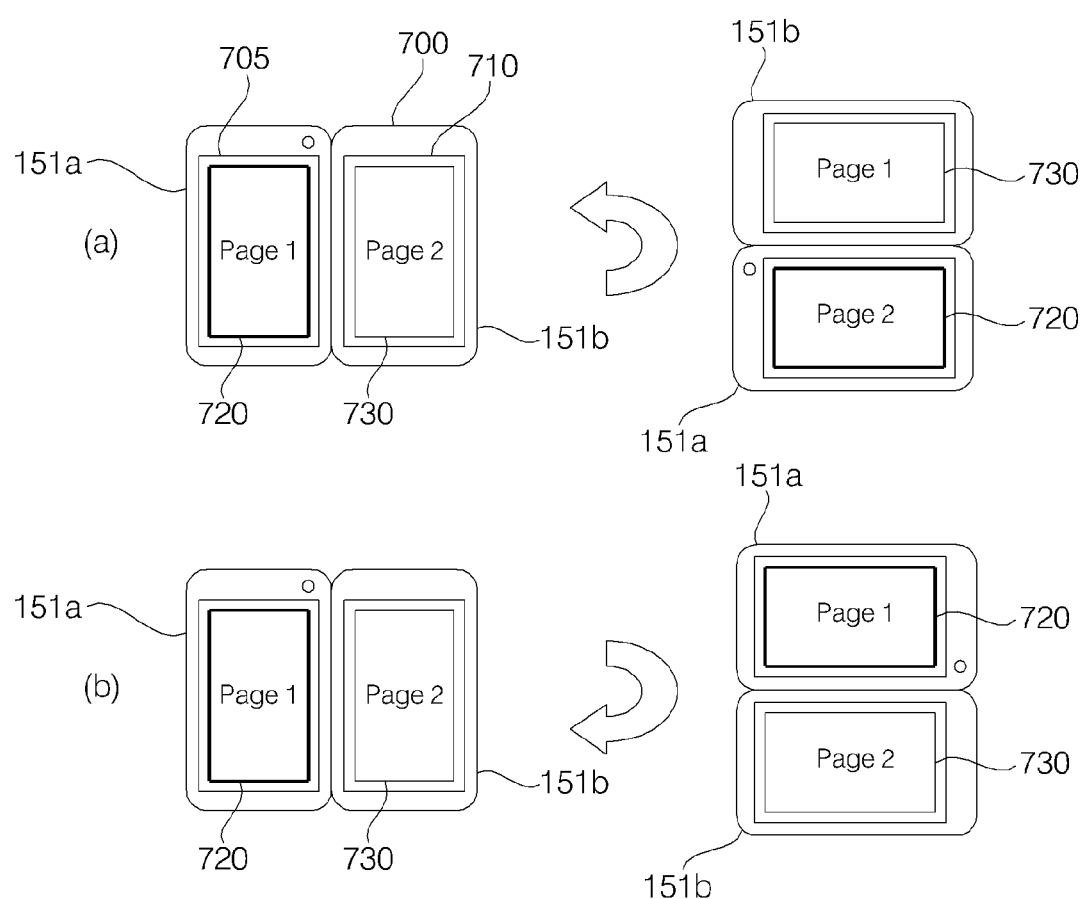

FIG. 6 illustrates the case in which the mobile terminal 100 includes only one display module 151. Referring to FIG. 6(a), first and second display regions 610 and 620 may be located on the left and right parts, respectively, of a screen 605 of the display module 151, and pages 1 and 2 may be displayed in the first and second display regions 610 and 620, respectively. That is, pages 1 and 2 may be displayed horizontally in line with each other. When the mobile terminal 100 stands upright, the lengthwise direction of the display module 151 may be perpendicular to the ground. The lengthwise direction of the display module 151 may indicate the direction of the long sides of the display module 151. If the mobile terminal 100 is rotated by −90 degrees (i.e., 90 degrees counterclockwise), the second display region 620 may be located on top of the first display region 610. Thus, page 1 may be displayed in the second display region 620, and page 2 may be displayed in the first display region 610. As shown in FIG. 6(a), page 1 and page 2 are rotated 90 degrees clockwise within the display regions 610, 620 to maintain a display orientation of any content, such as text, photos, and the like. As a result, pages 1 and 2 may be displayed vertically in line with each other. On the other hand, referring to FIG. 6(b), if the mobile terminal 100 is rotated by 90 degrees (i.e., 90 degrees clockwise), the first display region 610 may be located on top of the second display region 620. Thus, page 1 may be displayed in the first display region 610, and page 2 may be displayed in the second display region 620. As shown in FIG. 6(b), page 1 and page 2 are rotated 90 degrees counterclockwise within the display regions 610, 620 to maintain a display orientation of any content, such as text, photos, and the like. When the mobile terminal 100 is rotated and thus stands upright, the lengthwise direction of the display module 151 may become perpendicular to the ground.

FIGS. 7(a) and 7(b) illustrate the case in which the mobile terminal 100 includes two display modules. Referring to FIGS. 7(a) and 7(b), a mobile terminal 700 may include two display modules: first display module 151a and second display module 151b. More specifically, referring to FIG. 7(a), a first display region 720 may be on a screen 705 of the first display module 151a, a second display region 730 may be on a screen 710 of the second display module 151b, and pages 1 and 2 may be displayed in the first and second display regions 720 and 730, respectively. Thereafter, if the mobile terminal 700 is rotated by −90 degrees, the second display region 730 may be located on top of the first display region 720. Thus, page 1 may be displayed in the second display region 730, and page 2 may be displayed in the first display region 720. On the other hand, referring to FIG. 7(b), if the mobile terminal 700 is rotated by 90 degrees, the first display region 720 may be located on top of the second display region 730. Thus, page 1 may be displayed in the first display region 720, and page 2 may be displayed in the second display region 730.

Figure 8:
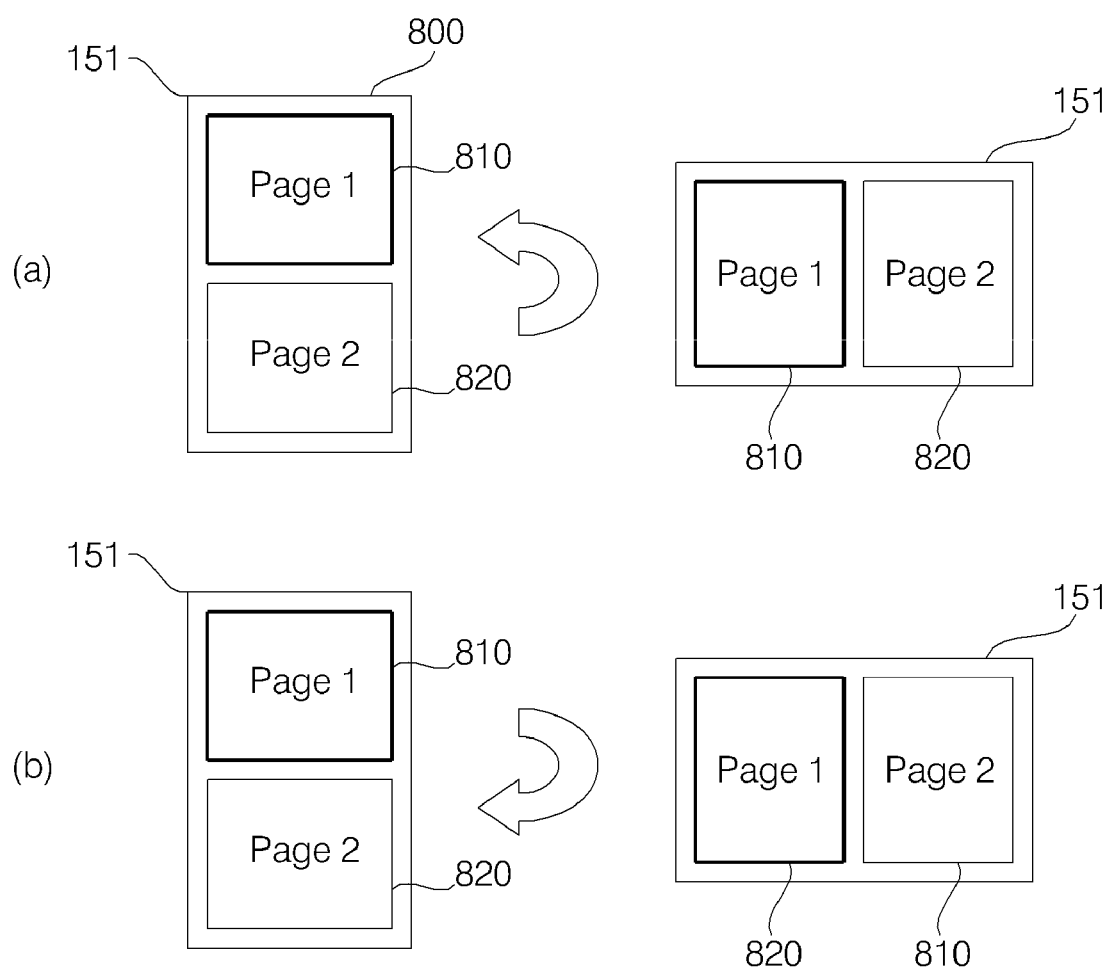
Figure 9:
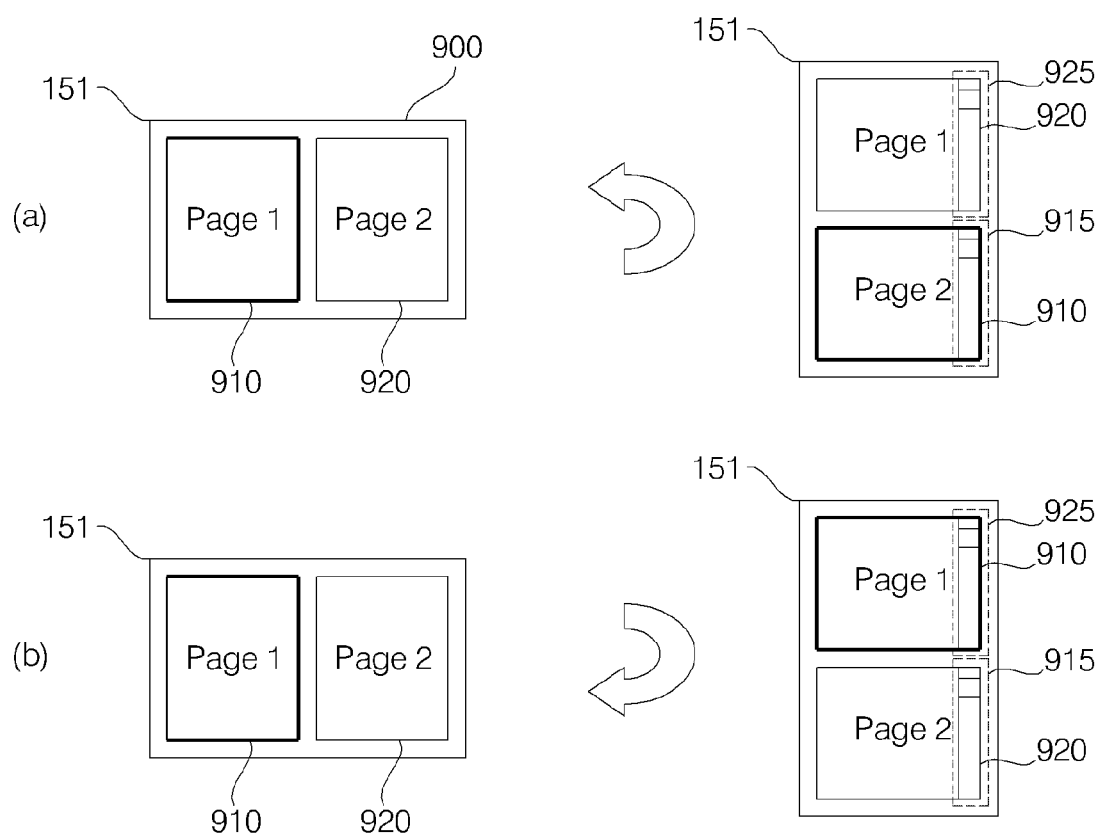
Figure 10:
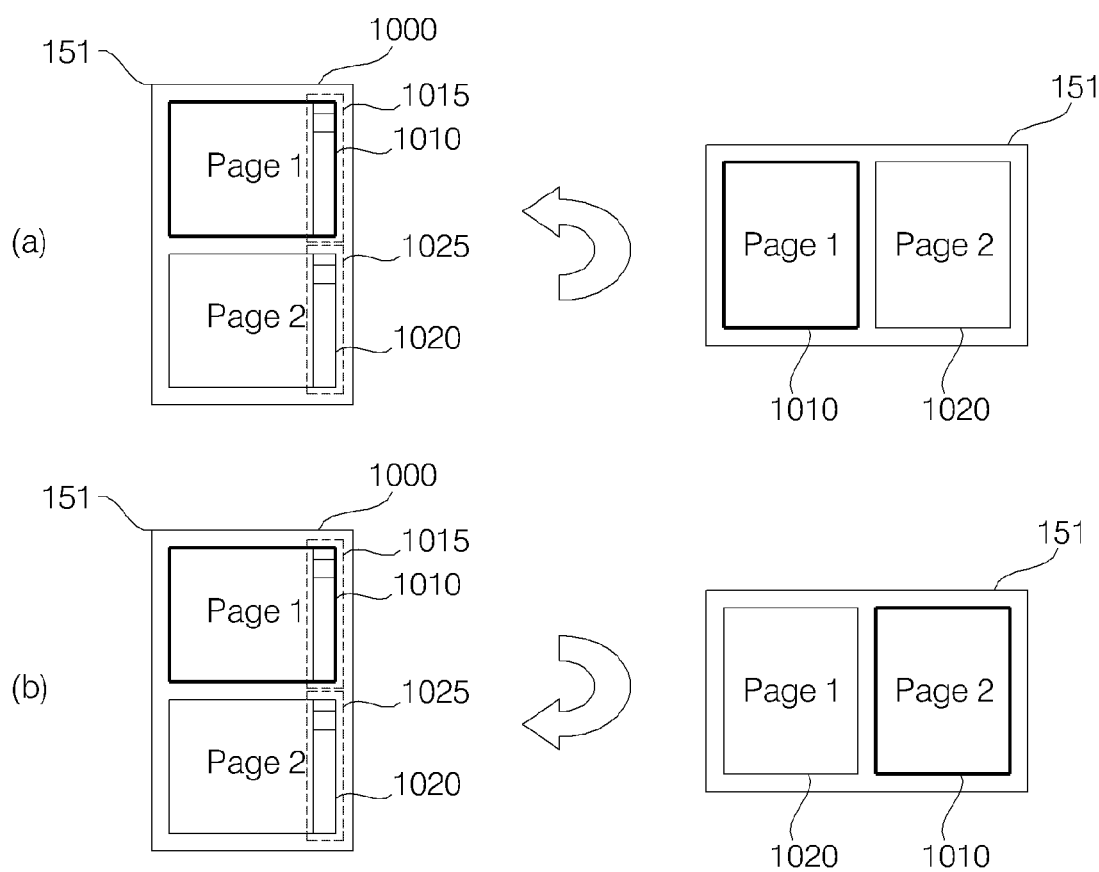

FIGS. 8 through 10 illustrate the case in which the mobile terminal 100 includes only one display module 151.

More specifically, referring to FIG. 8(a), first and second display regions 810 and 820 may be displayed on the upper and lower parts/portions, respectively, of a screen 800 of the display module 151, and pages 1 and 2 may be respectively displayed in the first and second display regions 810 and 820, respectively. That is, pages 1 and 2 may be displayed vertically in line with each other. Thereafter, if the mobile terminal 100 is rotated by −90 degrees, the first display region 810 may be located on the left side of the second display region 820. Thus, page 1 may be displayed in the first display region 810, and page 2 may be displayed in the second display region 820.

As a result, pages 1 and 2 may be displayed horizontally in line with each other. On the other hand, referring to FIG. 8(b), if the mobile terminal 100 is rotated by 90 degrees, the second display region 820 may be located on the left side of the first display region 810. Thus, page 1 may be displayed in the second display region 820, and page 2 may be displayed in the first display region 810. As a result, pages 1 and 2 may be displayed horizontally in line with each other. When the mobile terminal 100 stands upright, the lengthwise direction of the display module 151 may be perpendicular to the ground. On the other hand, when the mobile terminal 100 is rotated and thus stands upright, the lengthwise direction of the display module 151 may be parallel to the ground.

Referring to FIG. 9(a), a first display region 910 and a second display region 920 may be displayed on the left and right parts, respectively, of a screen 900 of the display module of the mobile terminal 100, and pages 1 and 2 may be displayed in the first and second display regions 910 and 920, respectively. That is, pages 1 and 2 may be displayed horizontally in line with each other. Thereafter, if the mobile terminal 100 is rotated by −90 degrees, page 1 may be displayed in the second display region 920, and page 2 may be displayed in the first display region 910. As a result, pages 1 and 2 may be displayed vertically in line with each other. In this case, since the first and second display regions 910 and 920 are both longer horizontally than vertically, pages 1 and 2 may not be able to be displayed entirely in the second and first display regions 920 and 910, respectively. Thus, a scroll bar 925 for scrolling up or down page 1 may be displayed in the second display region 920, and a scroll bar 915 for scrolling up or down page 2 may be displayed in the first display region 910. On the other hand, referring to FIG. 9(b), if the mobile terminal 100 is rotated by 90 degrees, page 1 and the scroll bar 925 may be displayed in the first display region 910, and page 2 and the scroll bar 915 may be displayed in the second display region 920.

Referring to FIG. 10(a), a first display region 1010 and a second display region 1020 may be displayed on the upper and lower parts, respectively, of a screen 1000 of the display module 151, page 1 and a scroll bar 1015 for scrolling up or down page 1 may be displayed in the first display region 1010, and page 2 and a scroll bar 1025 for scrolling up or down page 2 may be displayed in the second display region 1020. Thereafter, if the mobile terminal 100 is rotated by −90 degrees, page 1 may be displayed in the first display region 1010, and page 2 may be displayed in the second display region 1020. On the other hand, referring to FIG. 10(b), if the mobile terminal 100 is rotated by 90 degrees, page 1 may be displayed in the second display region 1020, and page 2 may be displayed in the first display region 1010. Since the first and second display regions 1010 and 1020 are both longer vertically than horizontally when the mobile terminal 100 is rotated by 90 or −90 degrees and thus lies in parallel to the ground, pages 1 and 2 may be able to be displayed as a whole. Thus, the scroll bars 1015 and 1025 may not be displayed.

Figure 11:
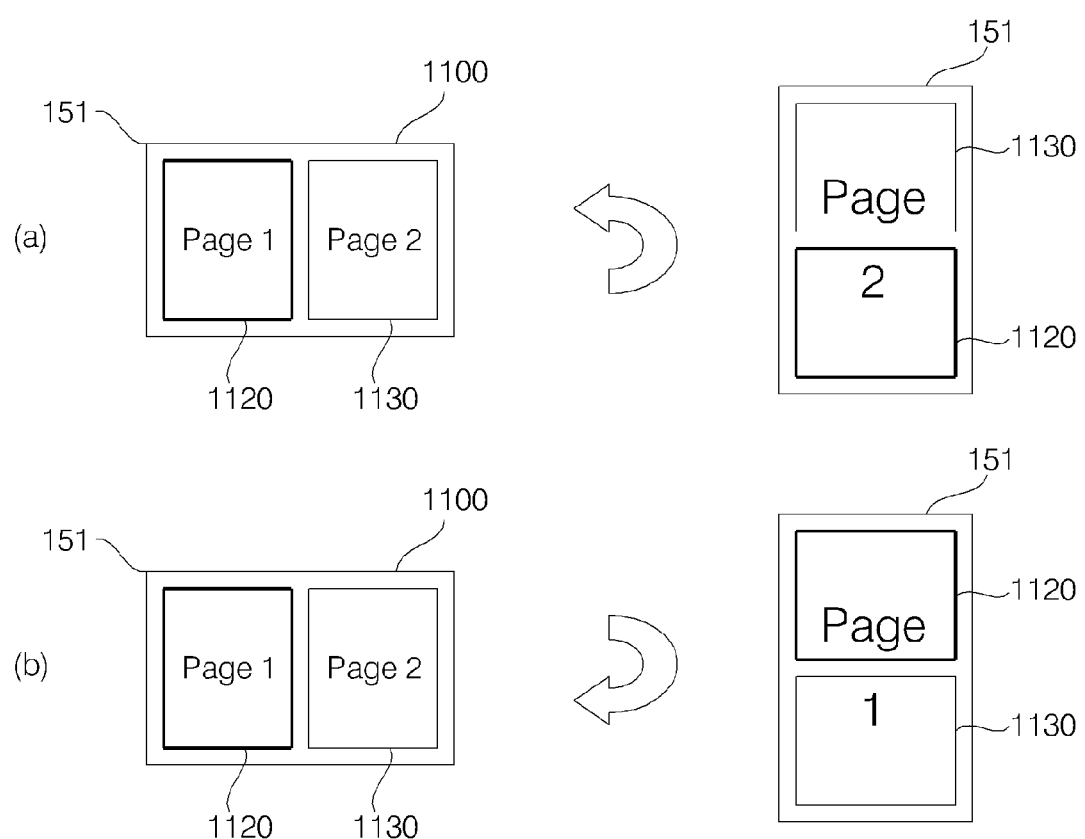
FIG. 11, FIG. 12, and FIG. 13 are diagrams for explaining the method of the second exemplary embodiment.
Figure 12:
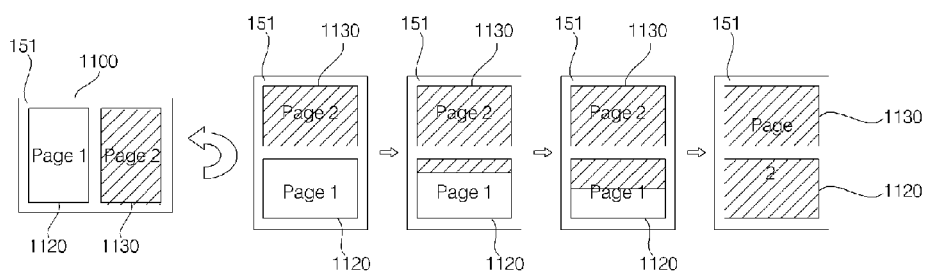
Figure 13:
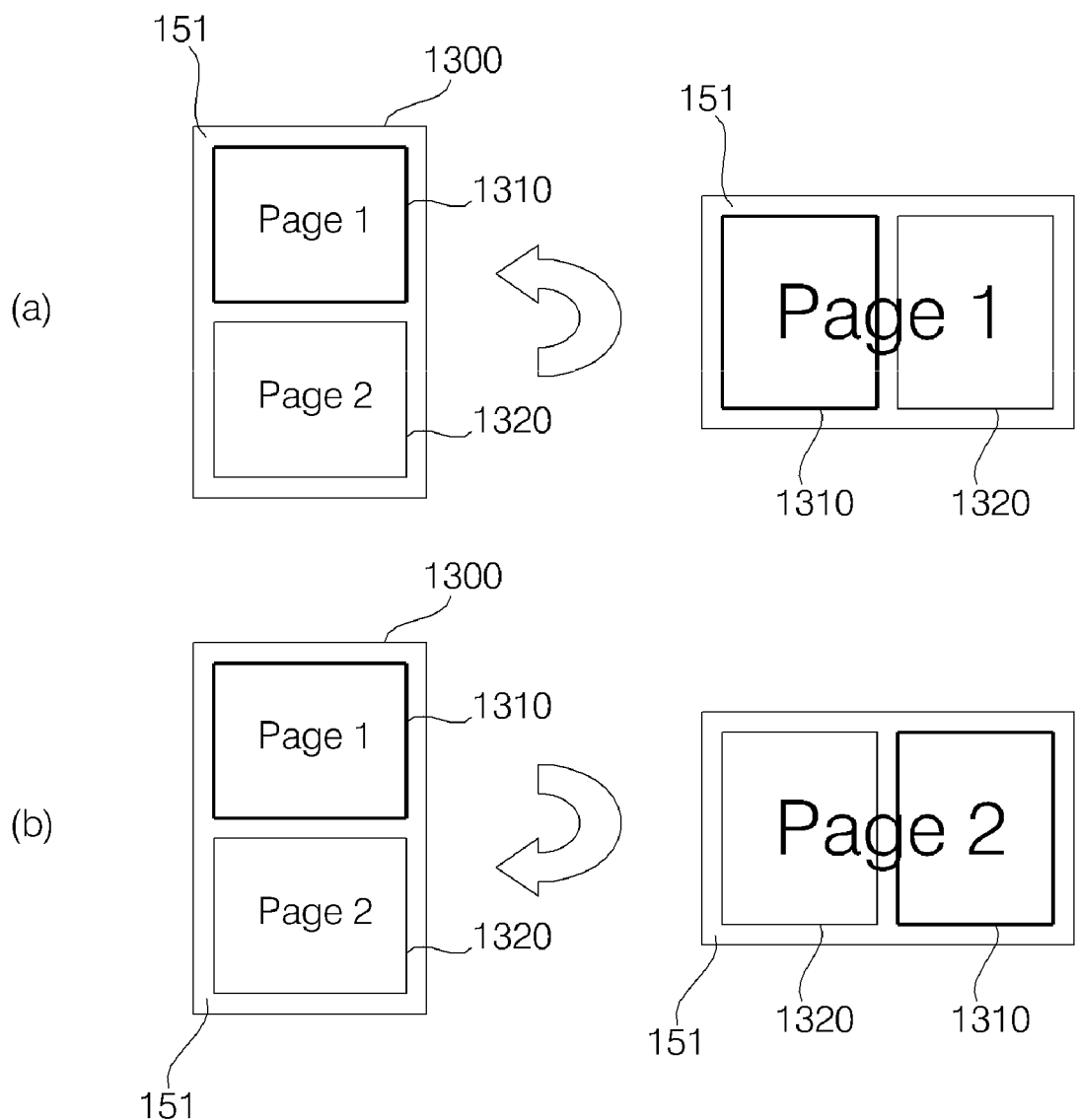

FIGS. 11 through 13 illustrate diagrams for explaining the method of the second exemplary embodiment.

Referring to FIG. 11(a), first and second display regions 1120 and 1130 may be displayed on the left and right parts, respectively, of a screen 1100 of the display module 151, and pages 1 and 2 may be displayed in the first and second display regions 1120 and 1130, respectively. Thereafter, if the mobile terminal 100 is rotated by −90 degrees, the second display region 1130 may be located on top of the first display region 1120, and thus, page 2 previously displayed in the second display region 1130 may be displayed in the combined area of the first and second display regions 1120 and 1130. On the other hand, referring to FIG. 11(b), if the mobile terminal 100 is rotated by 90 degrees, the first display region 1120 may be located on top of the second display region 1130, and thus, page 1 previously displayed in the first display region 1120 may be displayed in the combined area of the first and second display regions. When the mobile terminal 100 stands upright, the lengthwise direction of the display module 151 may be perpendicular to the ground. On the other hand, when the mobile terminal 100 is rotated and thus lies in parallel to the ground, the lengthwise direction of the display module 151 may be parallel to the ground.

Referring to FIG. 12, if the mobile terminal 100 is rotated by −90 degrees when pages 1 and 2 are displayed in the first and second display regions 1120 and 1130, respectively, as shown in FIG. 11(a), the second display region 1130 may be located on top of the first display region 1120, and thus, page 2 previously displayed in the second display region 1130 may be displayed not instantly, but in stages, in the combined area of the first and second display regions 1120 and 1130 by gradually encroaching upon the area of page 1.

Referring to FIG. 13(a), first and second display regions 1310 and 1320 may be displayed on the upper and lower parts, respectively, of a screen 1300 of the display module 151, and pages 1 and 2 may be displayed in the first and second display regions 1310 and 1320, respectively. Thereafter, if the mobile terminal 100 is rotated by −90 degrees, the first display region 1310 may be located on the left side of the second display region 1320, and thus, page 1 previously displayed in the first display region 1310 may be displayed in the combined area of the first and second display regions 1310 and 1320. In an exemplary embodiment, page 1 may be displayed not instantly, but in stages, in the combined area of the first and second display regions 1310 and 1320 by gradually encroaching upon the area of page 2, as described above with reference to FIG. 12. On the other hand, referring to FIG. 13(b), if the mobile terminal 100 is rotated by 90 degrees, the second display region 1320 may be located on the left side of the first display region 1310, and thus, page 2 previously displayed in the second display region 1320 may be displayed in the combined area of the first and second display regions 1310 and 1320. In an exemplary embodiment, page 2 may be displayed not instantly, but in stages, in the combined area of the first and second display regions 1310 and 1320 by gradually encroaching upon the area of page 1, as described above with reference to FIG. 12.

The mobile terminal according to the present invention and the method of controlling the operation of a mobile terminal according to the present invention are not restricted to the exemplary embodiments set forth herein. Therefore, variations and combinations of the exemplary embodiments set forth herein may fall within the scope of the present invention.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method of controlling the operation of a mobile terminal including a display module for displaying first content and second content and an acceleration sensor for providing measurement data on a direction of gravitational acceleration, the method comprising:
    displaying the first content and the second content on the display module;
    displaying the first content and the second content in line vertically and rotating the first content and the second content when the measurement data indicate that the mobile terminal has been rotated to a first position while uniformly maintaining a display direction of the display module; and
    displaying the first content and the second content in line horizontally and rotating the first content and the second content when the measurement data indicate that the mobile terminal has been rotated to a second position while uniformly maintaining the display direction of the display module.

2. The method of claim 1, wherein the first content and the second content are at least text data, moving images, still images, or virtual keypads.

3. The method of claim 1, wherein the second position is 90 degrees or −90 degrees from the first position.

4. The method of claim 1, wherein the mobile terminal has a widthwise edge and a lengthwise edge longer than the widthwise edge, the first position is a vertical position of the mobile terminal when the lengthwise edge is approximately perpendicular to the ground, and the second position is a horizontal position of the mobile terminal when the lengthwise edge is approximately parallel to the ground.

5. The method of claim 4, wherein:
    when the mobile terminal is rotated clockwise from the horizontal position to the vertical position, the first content and the second content are rotated counterclockwise;
    when the mobile terminal is rotated counterclockwise from the horizontal position to the vertical position, the first content and the second content are rotated clockwise and the first content and the second content are switched in position;
    when the mobile terminal is rotated clockwise from the vertical position to the horizontal position, the first content and the second content are rotated counterclockwise and the first content and the second content are switched in position; and
    when the mobile terminal is rotated counterclockwise from the vertical position to the horizontal position, the first content and the second content are rotated clockwise.

6. The method of claim 5, wherein when the mobile terminal is rotated from the horizontal position to the vertical position, the method further comprises:
    displaying a first scroll bar for scrolling the first content if the first content cannot be entirely displayed; and
    displaying a second scroll bar for scrolling the second content if the second content cannot be entirely displayed.

7. The method of claim 5, wherein when the mobile terminal is rotated from the vertical position to the horizontal position, the method further comprises:
    removing a displayed first scroll bar for scrolling the first content; and
    removing a displayed second scroll bar for scrolling the second content.

8. The method of claim 4, wherein the display module comprises a first display module and a second display module and the first content and the second content are displayed separately in one of the first display module or the second display module.

9. The method of claim 8, wherein when the first content is displayed in the first display module and the second content is displayed in the second display module, the method further comprises:
    when the mobile terminal is rotated clockwise from the horizontal position to the vertical position, the first content is rotated counterclockwise in the first display module and the second content is rotated counterclockwise in the second display module;
    when the mobile terminal is rotated counterclockwise from the horizontal position to the vertical position, the first content is rotated clockwise and moved to the second display module and the second content is rotated clockwise and moved to the first display module;
    when the mobile terminal is rotated clockwise from the vertical position to the horizontal position, the first content is rotated counterclockwise and moved to the second display module and the second content is rotated counterclockwise and moved to the first display module; and
    when the mobile terminal is rotated counterclockwise from the vertical position to the horizontal position, the first content is rotated clockwise in the first display module and the second content is rotated clockwise in the second display module.

10. The method of claim 8, wherein when the first content is displayed in the second display module and the second content is displayed in the first display module, the method further comprises:
    when the mobile terminal is rotated clockwise from the horizontal position to the vertical position, the first content is rotated counterclockwise in the second display module and the second content is rotated counterclockwise in the first display module;
    when the mobile terminal is rotated counterclockwise from the horizontal position to the vertical position, the first content is rotated clockwise and moved to the first display module and the second content is rotated clockwise and moved to the second display module;
    when the mobile terminal is rotated clockwise from the vertical position to the horizontal position, the first content is rotated counterclockwise and moved to the first display module and the second content is rotated counterclockwise and moved to the second display module; and
    when the mobile terminal is rotated counterclockwise from the vertical position to the horizontal position, the first content is rotated clockwise in the second display module and the second content is rotated clockwise in the first display module.

11. A method of controlling the operation of a mobile terminal including a display module having a first display region and a second display region and including an acceleration sensor for providing measurement data on a direction of gravitational acceleration, the method comprising:
    displaying first content and second content in a first display region and a second display region; and scaling up one of the first content or the second content and displaying the scaled-up content in a combined area of the first display region and the second display region, if the measurement data indicates the mobile terminal has been rotated while uniformly maintaining the display direction of the display module.

12. The method of claim 11, further comprising:
terminating the scaling up of the one of the first content or the second content by displaying the first content and the second content in the first display region and the second display region as previously displayed.

13. The method of claim 11, wherein said scaling up comprises:
gradually increasing a display area of the first content and gradually decreasing a display area of the second content until the second content is no longer displayed when the first content is above the second content in a vertical orientation or is left of the second content in a horizontal orientation; and
gradually increasing a display area of the second content and gradually decreasing a display area of the first content until the first content is no longer displayed when the second content is above the first content in a vertical orientation or is left of the first content in a horizontal orientation.

14. The method of claim 11, wherein:
when the mobile terminal is rotated clockwise from a second position to a first position, the second content is removed from being displayed, the first content is rotated counterclockwise, and the first content is scaled up for display in both the first display region and the second display region;
when the mobile terminal is rotated counterclockwise from the second position to the first position, the first content is removed from being displayed, the second content is rotated clockwise, and the second content is scaled up for display in both the first display region and the second display region;
when the mobile terminal is rotated clockwise from the first position to the second position, the first content is removed from being displayed, the second content is rotated counterclockwise, and the second content is scaled up for display in both the first display region and the second display region; and
when the mobile terminal is rotated counterclockwise from the first position to the second position, the second content is removed from being displayed, the first content is rotated clockwise, and the first content is scaled up for display in both the first display region and the second display region.

15. The method of claim 11, wherein:
the display module comprises a first display module having the first display region and a second display module having the second display region, the first content and the second content being displayed separately in one of the first display module or the second display module;
the first position is a vertical position in which the display module extends vertically and perpendicular to the ground, and the second position is a horizontal position in which the display module extends horizontally and parallel to the ground; and
when the mobile terminal is rotated clockwise from the horizontal position to the vertical position, the second content is removed from being displayed, the first content is rotated counterclockwise, and the first content is displayed scaled up in the first display module and the second display module;

when the mobile terminal is rotated counterclockwise from the horizontal position to the vertical position, the first content is removed from being displayed, the second content is rotated clockwise, and the second content is displayed scaled up in the second display module and the first display module;
when the mobile terminal is rotated clockwise from the vertical position to the horizontal position, the first content is removing from being displayed, the second content is rotated counterclockwise, and the second content is displayed scaled up in the second display module and the first display module; and
when the mobile terminal is rotated counterclockwise from the vertical position to the horizontal position, the second content is removed from being displayed, the first content is rotated clockwise, and the first content is displayed scaled up in the first display module and the second display module.

16. A mobile terminal comprising:
a display module for displaying first content and second content;
an acceleration sensor for providing measurement data on a direction of gravitational acceleration of the mobile terminal; and
a controller configured to display the first content and the second content in line vertically and to rotate the first content and the second content when the measurement data indicate that the mobile terminal has been rotated to a first position while uniformly maintaining a display direction of the display module, and configured to display the first content and the second content in line horizontally and to rotate the first content and the second content when the measurement data indicate that the mobile terminal has been rotated to a second position while uniformly maintaining the display direction of the display module.

17. The mobile terminal of claim 16, wherein the first position is a vertical position and the second position is a horizontal position, and wherein:
when the mobile terminal is rotated clockwise from the horizontal position to the vertical position, the controller is configured to rotate the first content and the second content counterclockwise;
when the mobile terminal is rotated counterclockwise from the horizontal position to the vertical position, the controller is configured to rotate the first content and the second content clockwise and to switch a position of the first content and the second content;
when the mobile terminal is rotated clockwise from the vertical position to the horizontal position, the controller is configured to rotated the first content and the second content counterclockwise and to switch a position of the first content and the second content; and
when the mobile terminal is rotated counterclockwise from the vertical position to the horizontal position, the controller is configured to rotate the first content and the second content clockwise.

18. A mobile terminal comprising:
a display module having a first display region and a second display region;
an acceleration sensor for providing measurement data on a direction of gravitational acceleration of the mobile terminal; and
a controller configured to display first content and second content in the first display region and the second display region, wherein the controller is configured to scale up either the first content or the second content and to display the scaled-up content in a combined area of the first display region and the second display region while uniformly maintaining the display direction of the display module, if the measurement data indicates the mobile terminal has been rotated.

19. The mobile terminal of claim 18, wherein:

when the mobile terminal is rotated clockwise from a second position to a first position, the controller is configured to remove the second content from being displayed, to rotate the first content counterclockwise, and to scale up the first content for display in both the first display region and the second display region;

when the mobile terminal is rotated counterclockwise from the second position to the first position, the controller is configured to remove the first content from being displayed, to rotate the second content clockwise, and to scale up the second content for display in both the first display region and the second display region;

when the mobile terminal is rotated clockwise from the first position to the second position, the controller is configured to remove the first content from being displayed, to rotate the second content counterclockwise, and to scale up the second content for display in both the first display region and the second display region; and when the mobile terminal is rotated counterclockwise from the first position to the second position, the controller is configured to remove the second content from being displayed, to rotate the first content clockwise, and to scale up the first content for display in both the first display region and the second display region.

20. The mobile terminal of claim 19, wherein the first position is a vertical position in which the display module extends vertically and perpendicular to the ground, and the second position is a horizontal position in which the display module extends horizontally and parallel to the ground.

* * * * *

(12) EX PARTE REEXAMINATION CERTIFICATE (10195th)
United States Patent
Kang et al.

(10) Number: US 8,078,134 C1
(45) Certificate Issued: Jun. 19, 2014

(54) MOBILE TERMINAL AND METHOD OF CONTROLLING OPERATION OF THE MOBILE TERMINAL

(75) Inventors: Rae Hoon Kang, Seoul (KR); Sang Soo Kim, Seoul (KR); Ha Yang Jung, Seoul (KR)

(73) Assignee: LG Electronics Inc., Yeouido-Dong, Yeongdeungpo-Gu, Seoul (KR)

Reexamination Request:
No. 90/012,988, Sep. 25, 2013

Reexamination Certificate for:
Patent No.: 8,078,134
Issued: Dec. 13, 2011
Appl. No.: 12/463,980
Filed: May 11, 2009

(30) Foreign Application Priority Data

Jun. 2, 2008 (KR) .................. 10-2008-0051706

(51) Int. Cl.
*H04B 1/16* (2006.01)

(52) U.S. Cl.
USPC .................................... 455/343.1; 455/575.1

(58) Field of Classification Search
None
See application file for complete search history.

(56) References Cited

To view the complete listing of prior art documents cited during the proceeding for Reexamination Control Number 90/012,988, please refer to the USPTO's public Patent Application Information Retrieval (PAIR) system under the Display References tab.

*Primary Examiner* — Ovidio Escalante

(57) ABSTRACT

A mobile terminal is provided including a display module, an acceleration sensor, and a controller. The display module is for displaying first content and second content. The acceleration sensor is for providing measurement data on a direction of gravitational acceleration. The controller is configured to display the first content and the second content in line vertically and to rotate the first content and the second content when the measurement data indicate that the mobile terminal has been rotated to a first position while uniformly maintaining a display direction of the display module. The controller is further configured to display the first content and the second content in line horizontally and to rotate the first content and the second content when the measurement data indicate that the mobile terminal has been rotated to a second position while uniformly maintaining the display direction of the display module.

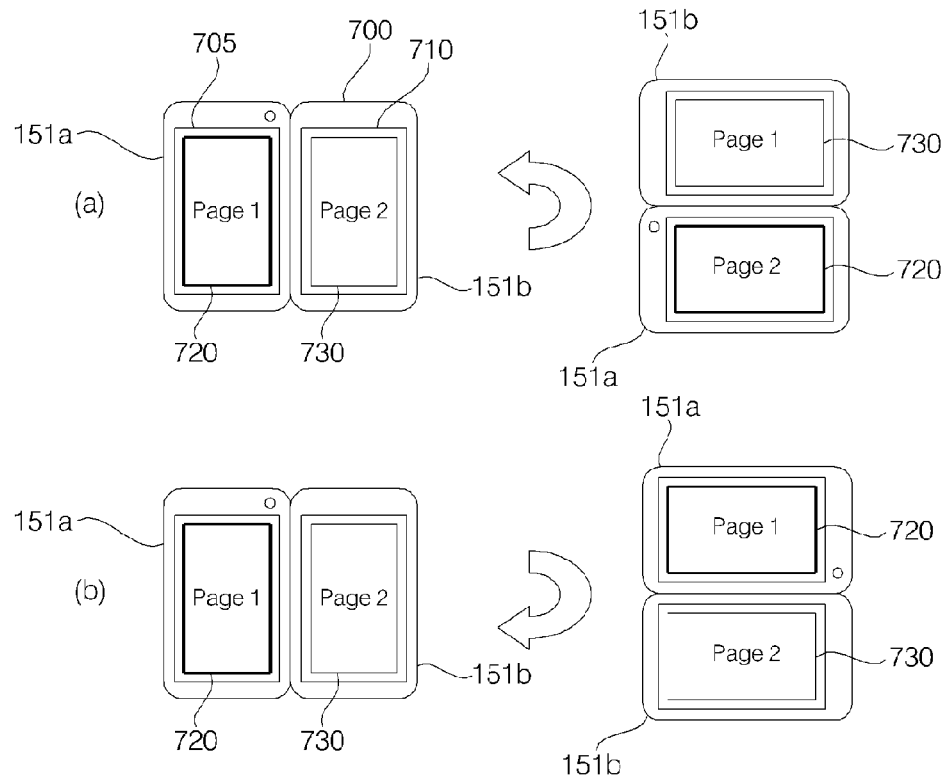

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 4 is cancelled.

Claims 1, 5, 8-10, 16 and 17 are determined to be patentable as amended.

Claims 2 and 3, dependent on an amended claim, are determined to be patentable.

New claims 21-38 are added and determined to be patentable.

Claims 6, 7, 11-15 and 18-20 were not reexamined.

1. A method of controlling the operation of a mobile terminal including a display module for displaying first content and second content and an acceleration sensor for providing measurement data on a direction of gravitational acceleration, the method comprising:
    displaying the first content and the second content on the display module;
    displaying the first content *at a first region of the display module* and the second content *at a second region of the display module* in line vertically and rotating the first content and the second content when the measurement data indicate that the mobile terminal has been rotated to a first position while uniformly maintaining a display direction of the display module, *wherein total area of the first region is substantially the same as total area of the second region*; [and]
    displaying the first content and the second content in line horizontally and rotating the first content and the second content when the measurement data indicate that the mobile terminal has been rotated to a second position while uniformly maintaining the display direction of the display module,
    *wherein the mobile terminal has a widthwise edge and a lengthwise edge longer than the widthwise edge, the first position is a vertical position of the mobile terminal when the lengthwise edge is approximately perpendicular to the ground, and the second position is a horizontal position of the mobile terminal when the lengthwise edge is approximately parallel to the ground,*
    *when the mobile terminal is rotated clockwise from the vertical position to the horizontal position, the first content and the second content are rotated counterclockwise and the first content and the second content are switched in region position such that the first content is displayed at the second region and the second content is displayed at the first region, and*
    *when the mobile terminal is rotated counterclockwise from the vertical position to the horizontal position, the first content and the second content are rotated clockwise and the first content and the second content are maintained in region position such that the first content continues to be displayed at the first region and the second content continues to be displayed at the second region.*

5. The method of claim [4] *1*, wherein:
    when the mobile terminal is rotated clockwise from the horizontal position to the vertical position, the first content and the second content are rotated counterclockwise; *and*
    when the mobile terminal is rotated counterclockwise from the horizontal position to the vertical position, the first content and the second content are rotated clockwise and the first content and the second content are switched in position[;
    when the mobile terminal is rotated clockwise from the vertical position to the horizontal position, the first content and the second content are rotated counterclockwise and the first content and the second content are switched in position; and
    when the mobile terminal is rotated counterclockwise from the vertical position to the horizontal position, the first content and the second content are rotated clockwise].

8. The method of claim [4] *1*, wherein the display module comprises a first display module and a second display module and the first content and the second content are displayed separately in one of the first display module or the second display module.

9. The method of claim 8, wherein when the first content is displayed in the first display module and the second content is displayed in the second display module, the method further comprises:
    when the mobile terminal is rotated clockwise from the horizontal position to the vertical position, the first content is rotated counterclockwise in the first display module and the second content is rotated counterclockwise in the second display module;
    when the mobile terminal is rotated counterclockwise from the horizontal position to the vertical position, the first content is rotated clockwise and moved to the second display module and the second content is rotated clockwise and moved to the first display module;
    when the mobile terminal is rotated clockwise from the vertical position to the horizontal position, the first content is [rotated counterclockwise and] moved to the second display module and the second content is [rotated counterclockwise and] moved to the first display module; and
    when the mobile terminal is rotated counterclockwise from the vertical position to the horizontal position, the first content is rotated clockwise in the first display module and the second content is rotated clockwise in the second display module.

10. The method of claim 8, wherein when the first content is displayed in the second display module and the second content is displayed in the first display module, the method further comprises:
    when the mobile terminal is rotated clockwise from the horizontal position to the vertical position, the first content is rotated counterclockwise in the second display module and the second content is rotated counterclockwise in the first display module;
    when the mobile terminal is rotated counterclockwise from the horizontal position to the vertical position, the first content is rotated clockwise and moved to the first display module and the second content is rotated clockwise and moved to the second display module;
    when the mobile terminal is rotated clockwise from the vertical position to the horizontal position, the first content is [rotated counterclockwise and] moved to the first display module and the second content is [rotated counterclockwise and] moved to the second display module; and when the mobile terminal is rotated counterclockwise from the vertical position to the horizontal position, the first content is rotated clockwise in the second display module and the second content is rotated clockwise in the first display module.

16. A mobile terminal comprising:

a display module for displaying first content and second content;

an acceleration sensor for providing measurement data on a direction of gravitational acceleration of the mobile terminal; and a controller configured to display the first content *at a first region of the display module* and the second content *at a second region of the display module* in line vertically and to rotate the first content and the second content when the measurement data indicate that the mobile terminal has been rotated to a first position while uniformly maintaining a display direction of the display module, *wherein total area of the first region is substantially the same as total area of the second region*, and configured to display the first content and the second content in line horizontally and to rotate the first content and the second content when the measurement data indicate that the mobile terminal has been rotated to a second position while uniformly maintaining the display direction of the display module,

*wherein the mobile terminal has a widthwise edge and a lengthwise edge longer than the widthwise edge, the first position is a vertical position of the mobile terminal when the lengthwise edge is approximately perpendicular to the ground, and the second position is a horizontal position of the mobile terminal when the lengthwise edge is approximately parallel to the ground,*

*when the mobile terminal is rotated clockwise from the vertical position to the horizontal position, the first content and the second content are rotated counterclockwise and the first content and the second content are switched in region position such that the first content is displayed at the second region and the second content is displayed at the first region, and*

*when the mobile terminal is rotated counterclockwise from the vertical position to the horizontal position, the first content and the second content are rotated clockwise and the first content and the second content are maintained in region position such that the first content continues to be displayed at the first region and the second content continues to be displayed at the second region.*

17. The mobile terminal of claim 16, [wherein the first position is a vertical position and the second position is a horizontal position, and] wherein:

when the mobile terminal is rotated clockwise from the horizontal position to the vertical position, the controller is configured to rotate the first content and the second content counterclockwise;

when the mobile terminal is rotated counterclockwise from the horizontal position to the vertical position, the controller is configured to rotate the first content and the second content clockwise and to switch a position of the first content and the second content[;

when the mobile terminal is rotated clockwise from the vertical position to the horizontal position, the controller is configured to rotated the first content and the second content counterclockwise and to switch a position of the first content and the second content; and when the mobile terminal is rotated counterclockwise from the vertical position to the horizontal position, the controller is configured to rotate the first content and the second content clockwise].

21. *The method of claim 1, wherein a content type of the first content is the same as a content type of the second content.*

22. *The method of claim 1, wherein a content type of the first content is an image and a content type of the second content is an image.*

23. *The method of claim 1, wherein the first content comprises an image stored on a removable memory card of the mobile terminal and the second content comprises an image stored on the removable memory card.*

24. *The method of claim 1, wherein the first content comprises a single image stored on a removable memory card of the mobile terminal and the second content comprises a single image stored on the removable memory card.*

25. *The method of claim 1, wherein the first content and the second content are each user-stored content stored in non-volatile memory of the mobile terminal.*

26. *The method of claim 1, further comprising:*

*storing a plurality of images on a removable memory card of the mobile terminal, wherein the first content and the second content are each obtained from a respective image of the stored plurality of images.*

27. *The method of claim 1, wherein dimensions of the first region are the same as dimensions of the second region.*

28. *The method of claim 1, further comprising:*

*receiving the first content and the second content via wireless communication with a network.*

29. *The method of claim 1, further comprising:*

*rotating the first content about a single axis and rotating the second content about a single axis when the measurement data indicate that the mobile terminal has been rotated to a first position; and*

*rotating the first content about a single axis and rotating the second content about a single axis when the measurement data indicate that the mobile terminal has been rotated to a second position.*

30. *The mobile terminal of claim 16, wherein a content type of the first content is the same as a content type of the second content.*

31. *The mobile terminal of claim 16, wherein a content type of the first content is an image and a content type of the second content is an image.*

32. *The mobile terminal of claim 16, wherein the first content comprises an image stored on a removable memory card of the mobile terminal and the second content comprises an image stored on the removable memory card.*

33. *The mobile terminal of claim 16, wherein the first content comprises a single image stored on a removable memory card of the mobile terminal and the second content comprises a single image stored on the removable memory card.*

34. *The mobile terminal of claim 16, wherein the first content and the second content are each user-stored content stored in non-volatile memory of the mobile terminal.*

35. *The mobile terminal of claim 16, wherein the controller is further configured to store a plurality of images on a removable memory card of the mobile terminal, and*

*wherein the first content and the second content are each obtained from a respective image of the stored plurality of images.*

36. The mobile terminal of claim 16, the controller is further configured to
receive the first content and the second content via wireless communication with a network.

37. The mobile terminal of claim 16, the controller is further configured to receive the first content and the second content via wireless communication with a network.

38. The mobile terminal of claim 16, the controller is further configured to rotate the first content about a single axis and rotating the second content about a single axis when the measurement data indicate that the mobile terminal has been rotated to a first position, and
rotate the first content about a single axis and rotate the second content about a single axis when the measurement data indicate that the mobile terminal has been rotated to a second position.

\* \* \* \* \*